United States Patent [19]

Scerbak et al.

[11] Patent Number: 4,909,612
[45] Date of Patent: Mar. 20, 1990

[54] OPTICAL ISOLATOR EMPLOYING MULTIPASS FARADAY ROTATION

[75] Inventors: David G. Scerbak, Morgan Hill; John Dutcher, Mountain View; Robert L. Mortensen, Palo Alto; Richard W. Wallace; William M. Grossman, both of Los Altos, all of Calif.

[73] Assignee: Lightwave Electronics Co., Mountain View, Calif.

[21] Appl. No.: 885,249

[22] Filed: Jul. 14, 1986

[51] Int. Cl.⁴ .......................... G02B 5/30; G02B 27/28
[52] U.S. Cl. ..................................... 350/375; 350/405
[58] Field of Search ............... 350/375, 378, 389, 405, 350/377

[56] References Cited

U.S. PATENT DOCUMENTS 4,712,880 12/1987 Shirasaki .............................. 350/377

FOREIGN PATENT DOCUMENTS 0185014 11/1982 Japan ................................... 350/375
0196721 10/1985 Japan ................................... 350/375

OTHER PUBLICATIONS

De Shazer, L. G., et al, "Optical Isolator for Near Infrared", Rev. of Scientific Instruments, vol. 38, No. 1, Feb., 1967, pp. 248-25.
Shiraishi, K, et al, "Compact Faraday Rotation for an Optical Isolator Using Magnets Arranged with Alternating Polarities", Optics Letter, vol. 11, No. 2, Feb. 1986, pp. 82-84.
Schmitt, R. L. et al, "Diode-Laser Pumped Nd:YAG Laser Injection Seeding System", Applied Optics, vol. 25, No. 5, Mar. 1986, pp. 629-633.

Primary Examiner—Bruce Y. Arnold
Attorney, Agent, or Firm—Rosenblum Parish Bacigalupi

[57] ABSTRACT

An optical Faraday isolator includes a slab of Faraday rotator medium coated to define input and output faces and internal reflective surfaces for causing the beam to travel between the input and output faces along a zig-zag path. Permanent magnets polarized in a direction normal to the plane defined by the zig-zag beam path are disposed on opposite sides of the beam path. The magnets are paired on each side with serially alternating polarity and the like poles are in transverse registration on opposite sides of the beam path to produce an intense, unidirectional magnetic field parallel to the beam path within the rotator slab. A quarterwave plate introduces a compensating amount of elliptical polarization to cancel unwanted elliptical polarization effects of the slab and its coatings. A beam shaving aperture at the exit of the slab shaves off divergent backward travelling rays.

9 Claims, 1 Drawing Sheet

OPTICAL ISOLATOR EMPLOYING MULTIPASS FARADAY ROTATION

BACKGROUND OF THE INVENTION

The present invention relates in general to optical isolators and, more particularly, to such isolators employing the Faraday effect with multipasses of a beam through a Faraday rotation medium.

DESCRIPTION OF THE PRIOR ART

Heretofore, multipass Faraday isolators have been proposed wherein a glass rod was disposed coaxially in a magnetic solenoid for generating an axial magnetic field in the glass rod. The glass was of a Faraday rotation material, such as lead glass, and mirrors were placed at opposite ends of the glass rod for reflecting the optical beam to and fro through the glass rod along a zig-zag path. Glan-Taylor linear polarizers aligned 45° to each other were placed at opposite ends of the Faraday rotation rod. Linearly polarized optical radiation passing through the isolator in the forward direction received 45° of rotation of the plane of polarization and linearly polarized backward travelling optical wave energy received another 45° of additive rotation in passing through the isolator such that when the backward travelling wave hit the input polarizer, it was polarized 90° to the polarization of that polarizer so as to be essentially totally reflected therefrom for isolating the source of the forward travelling beam energy from that energy being reflected back along the beam path. Nearly 30 dB of isolation was obtained over a bandwidth of 200 Å at 1.06 microns.

Such a prior art Faraday isolator is disclosed in an article entitled: "Optical Isolator for Near Infrared", appearing in the Review of Scientific Instruments, Vol. 38, pg. 248–250 of January 1967. The problem with this prior art, multipass Faraday rotator is that the solenoid is a relatively large and bulky element and requires water cooling to produce the requisite magnetic field intensity of 2,510 gauss within the Faraday rotation glass rod.

Others have proposed to miniaturize isolators by producing the intense magnetic field with permanent magnets serially arranged with alternating polarities to produce an axial magnetic field of alternating axial direction. Sections of Faraday rotator glass were placed serially along a beam path in the regions of maximum intensity of the alternating axial magnetic field and a half-wave plate was placed between sections of the Faraday rotator glass. In this arrangement the magnets were made of a rare-earth material such as Nd-Fe-B. The magnets were relatively expensive because they had a donut-like shape to produce the axial magnetic field coaxial with the beam path.

A Faraday rotator assembled for an isolator at a wavelength of 0.633 microns utilizing two Faraday rotator glass rods, each of 4 millimeter o.d. by 11 millimeters in length and utilizing two magnets each of 20.5 millimeters o.d. and 5 millimeters i.d. by 11.5 millimeters in length was reported to have produced an isolation of 32 dB.

Such a Faraday rotator is disclosed in an article entitled: "Compact Faraday rotator for an optical isolator using magnets arranged with alternating polarities", appearing in Optics Letters, Vol. 11, No. 2 of February 1986, pp. 82–84. The problem with this isolator is that the magnets are relatively expensive due to their donut-like shape and the halfwave plate is required to make the assembly operable.

Others have proposed a Faraday isolator design utilizing permanent magnets arranged with alternating polarities and avoiding the use of the halfwave plates between successive sections of Faraday rotator glass by axially spacing the glass rods apart by non-Faraday material (air) gaps occupy one-half a period of the spatial distribution of the alternating magnetic field on the axis of the beam path. In this design, four 2.03 centimeter long pieces of Faraday rotator glass were inserted on the axis of a stack of cylindrical axially magnetized samarium-cobalt magnets. The magnets had an outside diameter of 3.81 centimeters and an inside diameter of 0.66 centimeters and a thickness in the axial direction of 2.203 centimeters and were arranged in opposition to one another to enhance the magnetic field by a factor of 2 near the interface. Seven magnets were stacked to obtain the proper magnetic field distribution for the four glass rods. The isolator provided an isolation of approximately 10,000 to 1 for a 2 millimeter optical beam diameter. Such a Faraday isolator is disclosed in an article entitled: "Diode-Laser Pumped Nd:YAG Laser Injection Seeding System", appearing in Applied Optics, Vol. 25, No. 5 of March 1986, pp. 629–633.

The problem with this Faraday isolator is that it requires a relatively large number of expensive, permanent magnets and a relatively large number of Faraday rotator glass members to produce the required rotation of the plane of polarization. Moreover, there is an observable radial dependence of the polarization rotation that limits the attenuation in the backward direction.

It is desired to obtain an improved Faraday isolator which is less costly to manufacture and which provides improved isolation.

SUMMARY OF THE PRESENT INVENTION

The present invention relates generally to Faraday optical isolators and, more particularly, to Faraday isolators employing multipasses of an optical beam through a Faraday rotator medium.

In one feature of the present invention, pairs of flat magnets are serially disposed on opposite sides of a multipass Faraday rotator slab with poles of like polarity being disposed in transverse registration on opposite sides of the beam path to produce an intense, unidirectional, magnetic field parallel to the direction of the beam, whereby the fabrication of the isolator is simplified and its manufacturing cost reduced.

In another feature of the present invention, the Faraday rotator slab is coated with reflective coatings on opposed faces so that the beam is internally reflected in the slab, back-and-forth along a zig-zag path from the input to the output face of the slab, whereby the fabrication costs of the multipass Faraday rotator are reduced.

In another feature of the present invention, the Faraday rotator slab is pivotably mounted with an axis of revolution coincident with either the input or the output face of the Faraday rotator slab so that the amount of Faraday rotation obtained by the rotator slab may be adjusted without substantial mis-alignment of the rotator slab relative to the optical axis of the isolator.

In another feature of the present invention, a beam shaving aperture is disposed on the beam path between the output face of the Faraday rotator slab and the output polarizer of the isolator to shave off backward travelling divergent rays, whereby the isolation factor of the isolator is improved in use.

In another feature of the present invention, a quarterwave plate is disposed on the beam path between linear polarizers and the Faraday rotator slab for producing an adjustable amount of elliptical polarization to cancel elliptical polarization effects obtained in the Faraday rotator slab and coatings thereon, whereby the isolation factor of the isolator is improved.

Other features and advantages of the present invention will become apparent upon a perusal of the following detailed description taken in connection with the accompanying drawing wherein:

DESCRIPTION OF THE PREFERRED EMBODIMENTS

Figure 1:
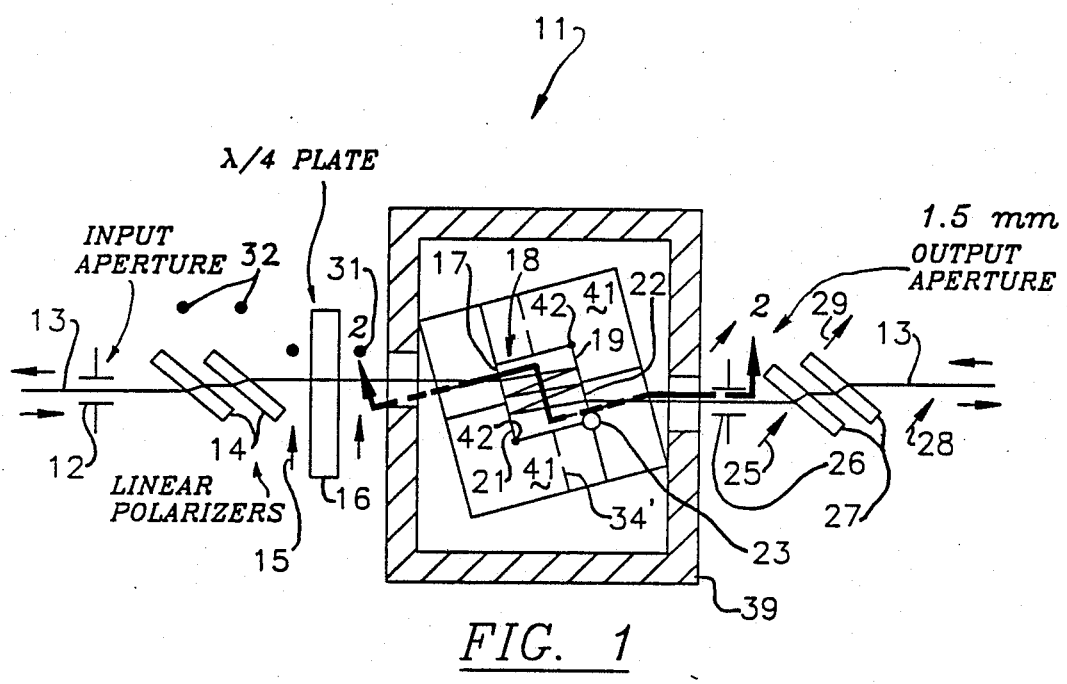
FIG. 1 is a, partly schematic top plan view of a section a Faraday isolator through incorporating features of the present invention.

Referring now to FIG. 1, there is shown a Faraday isolator 11 incorporating features of the present invention. The isolator 11 includes an input beam shaving aperture 12, as of 2 to 3 millimeters diameter, for shaving off and removing divergent rays contained within the forward travelling beam of optical radiation propagating along the optical axis 13 of the isolator 11. A pair of serially spaced, Brewster angled, linear polarizers 14 are disposed on the optical axis 13 for assuring a given linear polarization of the optical beam. In the case illustrated, the forward polarization is considered to be linear and vertically polarized. The linear polarizers 14 are adjusted so that the beam, after passing through the linear polarizers 14, contains pure vertically polarized radiation as indicated by the arrow at 15.

The linearly polarized beam is thence fed through a quarterwave plate 16 the principle axis of which is normal to and rotatable about the optical axis 13 for introducing an adjustable amount of elliptical polarization into the vertically polarized beam. The quarterwave plate 16 is adjusted such that the degree of elliptical polarization introduced into the beam is just equal and opposite to the degree of elliptical polarization that will be introduced by the slight birefringence of the below described Faraday rotator slab and by imperfections in the coatings on the Faraday rotator slab.

The forward travelling beam after passage through the quarterwave plate is thence fed through an optically transparent input face portion 17 of a multipass Faraday rotator slab 18. The rotator slab 18 is coated on a face 19 opposite the input face 17 with a reflective coating so as to totally internally reflect the beam passing through the input face 17 which is incident on the reflective face 19. The input face 17 and the reflective face 19 are tilted relative to the optical axis 13 so as to reflect the optical beam back toward the opposite side of the slab 18 which is coated with a totally reflective coating at 21 to reflect the optical beam back toward the reflective coating 19.

The slab 18 is inclined relative to the optical axis 13 so as to obtain the requisite number of internal reflections in order to obtain the desired amount of rotation of the plane of polarization of the optical energy propagating within the rotator slab 18. In a typical example, the slab 18 is inclined relative to the optical axis 13 so as to obtain three or five passes through the slab before exiting an optically transparent output face 22 of the slab 18. The slab 18 is rotatable about an axis of revolution 23 coincident with the output face 22 and normal to the propagation plane of the zig-zag path of the beam within the slab 18. As an alternative, the slab 18 may be pivoted about an axis of revolution coincident with the input face 17 of the slab 18. By rotating the slab 18 about an axis normal to the propagation plane coincident with either the input or the output face, the amount of misalignment of the optical beam path produced by adjustment of the rotation of the slab 18 is minimized.

A magnet assembly 24, described below relative to FIG. 2, produces a unidirectional magnetic field, generally parallel to the optical axis 13 within the slab 18 to obtain the desired degree of rotation of the plane of polarization of the optical radiation propagating along the beam path within the slab 18. In a preferred embodiment, the intensity of the magnetic field and the degree of rotation around axis 23 of the slab 18 are chosen so as to achieve approximately 45° of rotation of the plane of polarization of the optical beam in its transit through the rotator slab 18 as indicated at arrow 25. The rotated beam emerges through an output beam shaving aperture 26 as of 1.5 millimeters in diameter to shave from the beam divergent rays of optical radiation.

The beam is thence fed through a pair of linear polarizers 27 with their principal axes adjusted to be coincident with the polarization of the output beam from the rotator slab 18, so that the beam passes through the linear polarizers 27 in the forward direction as an output beam of the isolator 11 having the 45° polarization as indicated at arrow 28. The output beam is then fed to a utilization device such as for seeding a Nd:YAG laser oscillator in a manner as disclosed in the aforecited article entitled: "Diode Laser-Pumped Nd:YAG Laser Injection Seeding System".

In a typical example, the utilization device produces a substantial amount of beam power to be reflected back along the optical axis 13 with a polarization substantially the same as that of the output beam 28. This reflected energy polarization is depicted by arrow 29. The reflected or backward travelling beam energy then passes through the linear polarizers 27, beam aperture 26 and back into the rotator slab 18 for multiple passes and then is reflected through the input face 17 out of the slab 18 as a backward travelling wave. The backward travelling wave has been rotated by slab 18 by the same number of degrees as it was rotated in the forward direction and the rotation is cumulative so that to the 45° of rotation obtained in the forward direction, another 45° is added for the backward travelling wave. Hence, the polarization of the backward travelling wave, after traversing the slab 18, is 90° to the polarization of the forward travelling wave as indicated by a dot 31.

Thence, the backward travelling wave passes through the quarterwave plate 16 to cancel the elliptical polarization produced by the rotator slab and its coatings. The backward travelling wave thence passes into the linear polarizers 14 where its polarization is at 90° to the polarization in the forward direction. Therefore, substantially all of the backward travelling wave is reflected off of the serial linear polarizers 14 as indicated by the arrows 32.

In a typical example, the Faraday isolator 11 provides between 50,000 and 100,000 to 1 isolation. This prevents high power, backward travelling radiation from overheating dielectric coatings and devices within the source of the forward travelling beam, such source being, for example, a laser diode. In addition, attenuating the backward travelling wave prevents the source, such as a laser diode, from being de-stabilized due to the receipt therein of the backward travelling energy, which may be of a slightly different wavelength.

Figure 2:
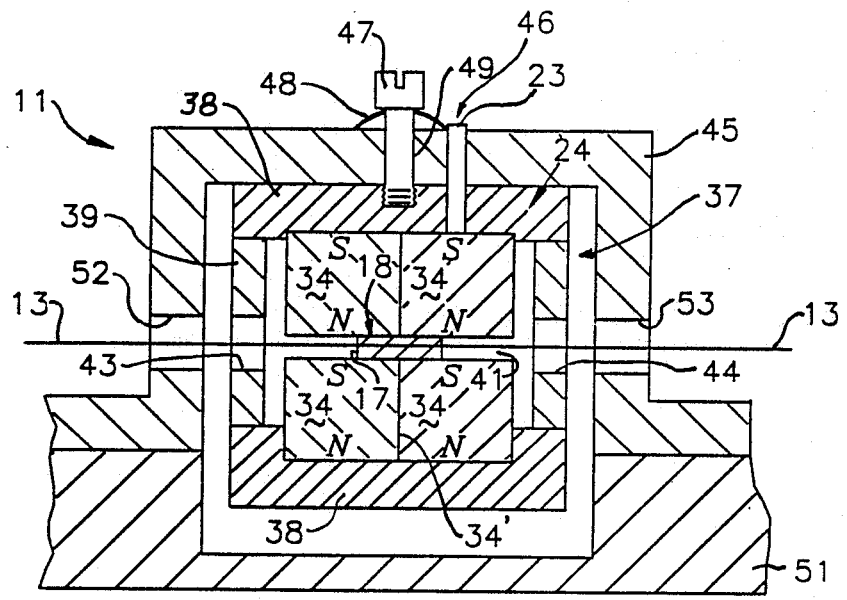
FIG. 2 is a sectional view elevational of the structure of FIG. 1 taken along line 2—2 in the direction of the arrows.

Referring now to FIG. 2, the magnet assembly 24 is shown in greater detail. More particularly, the magnet assembly 24 includes four flat, permanent magnets 34. Each of the magnets 34 is magnetically polarized in a direction generally transverse to the propagation plane of the zig-zag path 13 within the rotator slab 18. The magnet assembly 24 includes two sets or pairs of the magnets 34 with the magnets of each pair serially arranged along the optical axis 13 with one pair of magnets being disposed on one side of the optical axis 13 and the other pair of magnets being disposed on the other side of the optical axis 13 and with both pairs of magnets abutting the slab 18 on opposite major faces thereof. The magnets 34 are arranged so that magnetic poles of like polarity between respective pairs are disposed in transverse registration on opposite sides of the optical axis 13 and so that within pairs the poles alternate in polarity along the beam path. The magnets 34 on each side of the beam path are disposed in abutting relation with the abutting side edges thereof disposed essentially in the lengthwise vertical midplane 34' (FIG. 1) of the slab 18. The poles also overhang opposite ends of the slab 18. In this configuration, an intense unidirectional magnetic field is produced in the propagation plane of the zig-zag beam path within the rotator slab 18 with the field being directed generally parallel to the beam path.

The rotator slab 18 is captured on opposite side edges by means of a pair of generally L-shaped spacer members 41, as of aluminum. Stress relief bores 42 are provided in the spacers 41 at their internal corners to prevent excessive stress from being applied to the slab 18. The magnets 34 are captured by a magnet housing 37 between a pair of end caps 38 of a magnetically permeably material such as soft iron including recesses to receive the magents 34. The end-caps 38 are bolted together also over the ends of a rectangular housing 39, as of aluminum, having beam entrance and exit bores 43 and 44 to accommodate passage of the optical beam through the magnet housing 37. The magnet housing 37 is pivotably mounted to a mounting bracket 45, as of aluminum, via the intermediary of a pin 46 coincident with the axis of revolution 23 and passing through bores in the upper end-cap 38 of the magnet assembly and the bracket 45.

The magnet housing 37 is held to the bracket 45 by means of a cap screw 47 threadably mating with a bore in end-cap 38 of the magnet assembly 24 and including a spring washer 48 for tensioning the cap screw 48 and holding the magnet housing 37 into firm engagement with the bracket 45. The bore 49 in the bracket 45 to accommodate the cap screw 47 is elongated to allow pivoting of the magnet assembly 24 about the axis of rotation 23, for adjusting the angular position of the slab 18 relative to the optical axis 13. Bracket 45 is mounted to a base support structure 51 for supporting the isolator from an optical support. Bores 52 and 53 are provided in the bracket 45 on the optical axis for passage of the beam therethrough.

In a typical example, the linear polarizers 14 and 27 comprise a pair of thin film polarizers model TFP-29R-1.06 supported on a post at Brewster's angle and are commercially available from Northwest Optical Inc. of Burleigh Park, Fishers, New York. The quarterwave plate 16 is commercially available, as Model WP-4-050-106-LM coated with MLAR-106 on both sides, from Virgo Optics, Inc. of Port Richey, Fla. The Faraday rotator slab 18 is made of FR-5 glass commercially available from Hoya Glass and has a thickness as of 0.125", a length of 0.433" and a width of 0.472". The magnets 34 have a length of 1", a thickness of 0.4378" and a width of 0.5" and are made of Nd-Fe-B material and are commercially available from I.G. Technologies of Valparaiso, Ind.

In operation, the Faraday isolator 11 produces an isolation of between 50,000 and 10,000 to 1 at an operable wavelength of 1.06 microns and provides 80% transmission in the forward direction.

The advantages of the isolator 11 of the present invention include:

The flat magnet configuration is less expensive when contrasted with the donut-shaped magnets of the prior art. The flat magnet design is particularly advantageous when utilized with a slab of multipass Faraday rotator medium. The multipass Faraday rotator slab minimizes the number of polished faces and the number of coatings required as only two surfaces are required to be coated. The pivoted slab allows for minor adjustments in the amount of rotation of the plane of polarization. The beam shaving aperture between the slab and the output polarizer prevents stray light travelling in the backward direction from passing through the rotator slab 18 at odd angles which could result in such stray light passing back through the slab in a different number of passes than the forward travelling wave and thus not being rotated properly so that it could pass back through the dual polarizers 14 to the source. The quarterwave plate 16 provides an adjustment for cancelling birefringence and other depolarizing effects of the rotator slab to improve the isolation factor of the isolator 11.

As thus far described, the quarterwave plate 16 was positioned between the Faraday rotator slab 18 and the input linear polarizers 14. This is not a requirement, in that the quarterwave plate 16 may alternately be disposed inbetween the Faraday rotator slab 18 and the output linear polarizers 27 for the same effect, namely, to cancel elliptical polarizing effects of the slab 18 and its coatings.

What is claimed is:

1. In a Faraday rotator optical isolator:
   Faraday rotator means for magnetically inducing rotation of a plane or polarization of a beam of polarized optical radiation propagating in a beam along a beam path around an optical axis passing through said Faraday rotator means;
   permanent magnet means for producing an intense, unidirectional magnetic field in said Faraday rotator means for inducing the rotation of the plane of polarization of the optical radiation of the beam;
   said permanent magnet means including at least four permanent magnets, each magnet being permanently magnetized with a magnetic polarization direction generally transverse to the path of the beam;
   said magnets being disposed in sets on opposite sides of the beam path with the magnets of one set being disposed generally in transverse registration with the magnets of the other set, and said magnets of each set being arranged along the beam path, with alternating polarities, and the magnets of the two sets having like poles facing each other across the beam path for producing an intense, unidirectional magnetic field in the space therebetween with the unidirectional magnetic field having a predominant component thereof directed generally parallel to the direction of the beam path.

2. The isolator of claim 1 wherein said Faraday rotator means includes a rotator slab of optically transparent material disposed in the intense, unidirectional magnetic field for exhibiting the Faraday rotation effect on the optical beam passing therethrough, and wherein the rotator slab has optically transparent input face and output face portions; and optical reflector means for reflecting the beam back-and-forth along a zig-zag path defining a propagation plane through said slab from said input face to said output face.

3. The isolator of claim 2 including means for pivoting said rotator slab about an axis of rotation generally coincident with one of said input or output face portions and generally normal to said propagation plane, whereby rotation of said slab about said axis permits adjustment of the amount of Faraday rotation obtained by said rotator slab while retaining optical alignment of the rotator slab with said optical axis.

4. The isolator of claim 2 including an output linear polarizer disposed in the beam path of the Faraday-rotated beam after its passage in the forward direction through the rotator slab, and having its polarization oriented generally parallel to the plane of polarization of the Faraday-rotated beam, for transmitting the Faraday rotated beam and for rejecting beam not so polarized.

5. The isolator of claim 4 including a linear polarizer disposed across said beam and a beam shaving aperture disposed on the beam path inbetween said Faraday rotator slab and said output linear polarizer for shaving off beam rays divergent from the desired beam path.

6. The isolator of claim 2 including a linear polarizer disposed across said beam and a quarterwave plate disposed across said path between said linear polarizer and said rotator slab for passage of the beam of linearly polarized optical radiation therethrough and oriented for offsetting elliptical polarization effects generated by said rotator slab.

7. The isolator of claim 2 wherein said optical reflector means includes opposed optically reflective faces of said rotator slab between which the beam is reflected internally of said slab along the zig-zag path inbetween said input face portion and said output face portion.

8. In a Faraday optical isolator:

Faraday rotator means comprising a Faraday rotator medium for magnetically inducing rotation of a plane of polarization of a beam of polarized optical radiation propagating through said Faraday rotator medium along a beam path therein;

magnet means for producing an intense, unidirectional magnetic field in said Faraday rotator medium for inducing the rotation of the plane of polarization of the optical radiation of the beam;

said Faraday rotator medium comprising a slab of optically transparent Faraday rotator material;

said Faraday rotator slab having an optically transparent input face portion and an optically transparent output face portion, and spaced-apart optically reflective structure between which the beam is reflected back-and-forth along a zig-zag path between said input face portion and said output face portion; and means for pivoting said rotator slab about an axis of rotation generally coincident with one of said input and output transparent faces of said rotator slab and said axis of rotation being generally normal to the plane of the zig-zag beam path within said slab, whereby rotation of said slab permits adjustment of the amount of Faraday rotation obtained by said rotator slab while retaining optical alignment of the rotator slab with the optical axis of the isolator.

9. Faraday rotator means comprising:

a Faraday rotator medium for passing light having a plane of polarization in a beam propagating along an optical axis through said rotator medium, and for rotating said plane of polarization around said axis and introducing elliptical polarization into light in said beam while in the presence of a magnetic field parallel to said axis;

magnet means for concentrating a magnetic field parallel to said axis in said rotator medium so as to magnetically rotate the plane of polarization of said light; and quarter-wave plate means for passing linearly polarized light propagating in either direction along said axis in beams and for offsetting therefrom elliptical polarization effects introduced by passing through said Faraday rotator medium.

* * * * *